(12) United States Patent
Pope et al.

(10) Patent No.: US 9,157,328 B2
(45) Date of Patent: Oct. 13, 2015

(54) COOLED GAS TURBINE ENGINE COMPONENT

(75) Inventors: J. Edward Pope, Greenwood, IN (US); Jeffery Forest Rhodes, Zionsville, IN (US); Douglas J. Snyder, Carmel, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 586 days.

(21) Appl. No.: 13/334,751

(22) Filed: Dec. 22, 2011

(65) Prior Publication Data

US 2012/0237333 A1 Sep. 20, 2012

Related U.S. Application Data

(60) Provisional application No. 61/427,128, filed on Dec. 24, 2010.

(51) Int. Cl.
*F01D 5/18* (2006.01)
*F01D 25/12* (2006.01)

(52) U.S. Cl.
CPC ............. *F01D 5/186* (2013.01); *F01D 25/12* (2013.01); *F05D 2250/70* (2013.01); *Y02T 50/676* (2013.01)

(58) Field of Classification Search
CPC ......... F01D 5/186; F01D 5/187; F01D 25/12; F05D 2260/602
USPC .............. 415/115, 116; 416/96 R, 96 A, 97 R
See application file for complete search history.

(56) References Cited

U.S. PATENT DOCUMENTS

| | | | |
|---|---|---|---|
| 4,269,032 A | 5/1981 | Meginnis et al. | |
| 4,292,376 A | 9/1981 | Hustler | |
| 4,302,940 A | 12/1981 | Meginnis | |
| 4,684,323 A * | 8/1987 | Field | 416/97 R |
| 5,261,223 A | 11/1993 | Foltz | |
| 5,609,779 A | 3/1997 | Crow et al. | |
| 5,653,110 A | 8/1997 | Lee et al. | |
| 6,170,266 B1 | 1/2001 | Pidcock et al. | |
| 6,237,344 B1 | 5/2001 | Lee | |
| 6,282,905 B1 | 9/2001 | Sato et al. | |
| 6,307,175 B1 | 10/2001 | Blochlinger et al. | |
| 6,368,060 B1 | 4/2002 | Fehrenbach et al. | |

(Continued)

OTHER PUBLICATIONS

International Search Report and Written Opinion, PCT/US2011/67131, Rolls-Royce North American Technology, Inc., Apr. 27, 2012.

*Primary Examiner* — Christopher Verdier
(74) *Attorney, Agent, or Firm* — Krieg DeVault, LLP

(57) ABSTRACT

A gas turbine engine component is disclosed having a cooling fluid passageway that provides relatively cool fluid to a surface of the gas turbine engine component. The cooling fluid passageway can be shaped in cross section to reduce a stress present in the gas turbine engine component. One form of the shape is non-circular. The gas turbine engine component can be formed such that an overhanging material otherwise formed by the intersection of a cooling fluid passageway and a surface of the gas turbine engine component is absent. The gas turbine engine component can also have a depression formed near the surface of the gas turbine engine component such that the cooling fluid passageway exits into an upstream portion and a downstream portion of the depression.

23 Claims, 7 Drawing Sheets

(56) References Cited

U.S. PATENT DOCUMENTS

| | | |
|---|---|---|
| 6,383,602 B1 | 5/2002 | Fric et al. |
| 6,408,629 B1 | 6/2002 | Harris et al. |
| 6,434,821 B1 | 8/2002 | Nelson et al. |
| 6,546,731 B2 | 4/2003 | Alkabie et al. |
| 6,681,577 B2 | 1/2004 | Bolender et al. |
| 6,744,010 B1 | 6/2004 | Pepe et al. |
| 6,914,214 B2 | 7/2005 | Byrd et al. |
| 7,041,933 B2 | 5/2006 | Forrester et al. |
| 7,328,580 B2 | 2/2008 | Lee et al. |
| 7,645,123 B1 | 1/2010 | Liang |
| 8,529,193 B2 * | 9/2013 | Venkataramanan et al. .. 415/115 |
| 8,628,293 B2 * | 1/2014 | Ramachandran et al. .... 415/115 |
| 2002/0078691 A1 | 6/2002 | Hoecker |
| 2003/0106318 A1 | 6/2003 | Leahy, Jr. |
| 2003/0115881 A1 | 6/2003 | Lee et al. |
| 2003/0115882 A1 | 6/2003 | Lee et al. |
| 2005/0286998 A1 * | 12/2005 | Lee et al. ...................... 415/117 |
| 2008/0163604 A1 | 7/2008 | Spangler |
| 2009/0001061 A1 | 1/2009 | Beck et al. |
| 2010/0008759 A1 | 1/2010 | Johns et al. |

* cited by examiner

COOLED GAS TURBINE ENGINE COMPONENT

RELATED APPLICATIONS

The present application claims the benefit of U.S. Provisional Patent Application No. 61/427,128 filed Dec. 24, 2010 which is incorporated herein by reference.

GOVERNMENT RIGHTS

The present inventions were made with U.S. Government support under contract number N00019-96-C-0176 awarded by the United States Navy. The United States Government may have certain rights in the present inventions.

TECHNICAL FIELD

The present invention generally relates to cooled gas turbine engine components, and more particularly, but not exclusively, to reducing stress in gas turbine engine components by incorporating variations in cooling fluid passageways and a hot surface of gas turbine engine components.

BACKGROUND

Improving the life expectancy of gas turbine engine components, and particularly cooled gas turbine engine components, remains an area of interest. Some existing systems have various shortcomings relative to certain applications. Accordingly, there remains a need for further contributions in this area of technology.

SUMMARY

One embodiment of the present invention is a unique gas turbine engine component having a cooling fluid passageway. Other embodiments include apparatuses, systems, devices, hardware, methods, and combinations for providing cooling fluid for gas turbine engine components. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
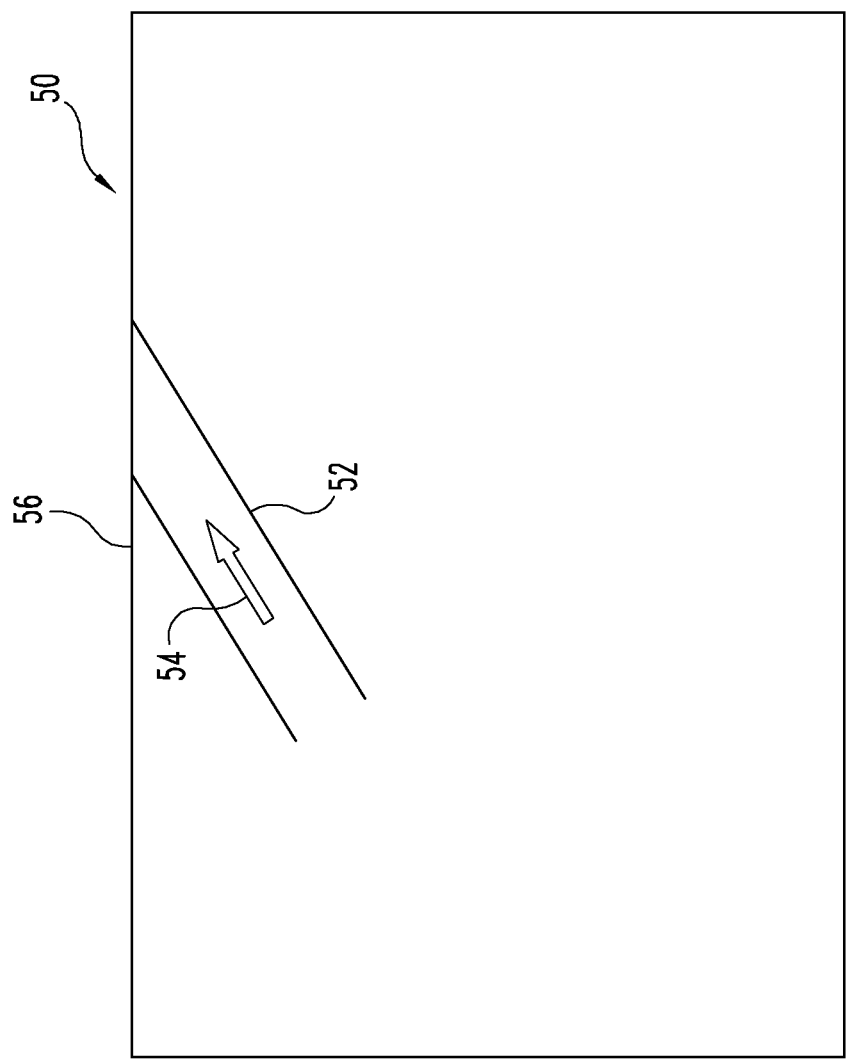
FIG. 1 depicts one form of the present application.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a gas turbine engine component 50 is shown having a cooling fluid passageway 52 useful for delivering a flow of cooling fluid 54 to a hot surface 56 of the gas turbine engine component 50. The cooling fluid passageway 52 is capable of delivering the cooling fluid 54 at a variety of temperatures, pressures, and flow rates. In one form the cooling fluid 54 is a flow of air from a compressor section of a gas turbine engine (not shown). The cooling fluid 54 can also originate from other locations of the gas turbine engine, or other locations of an aircraft coupled to the gas turbine engine. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Figure 2:
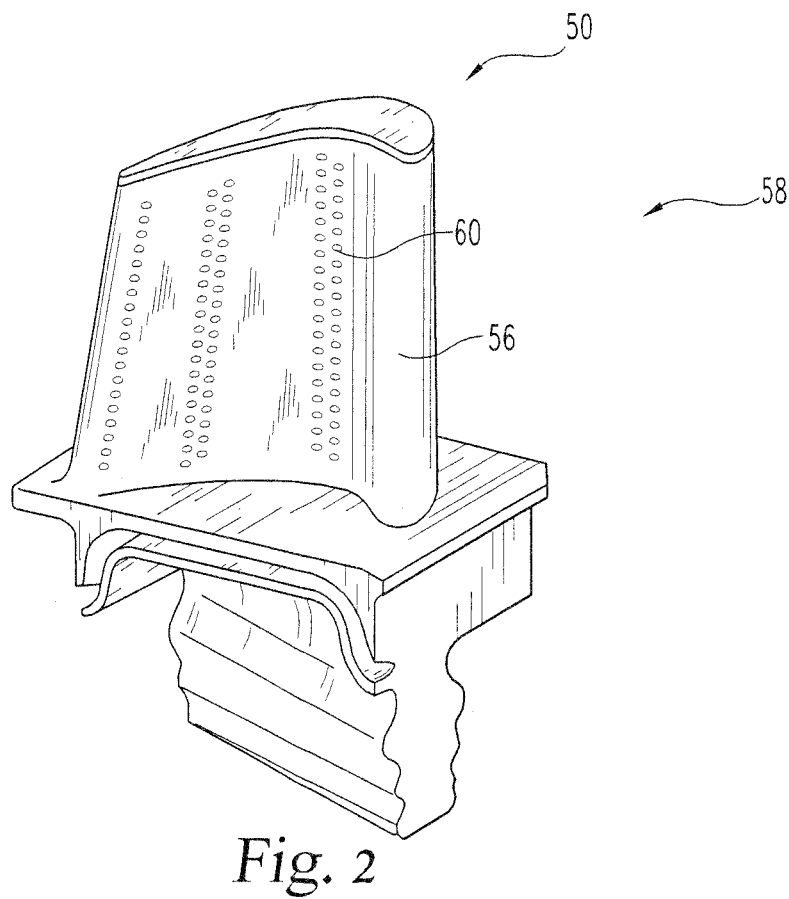
FIG. 2 depicts an embodiment of a gas turbine engine component.

Turning to FIG. 2, the gas turbine engine component 50 can take the form of an engine blade 58. Apertures 60 formed in the hot surface 56 are in fluid communication with the cooling fluid passageway 52 (shown schematically in FIG. 1). The apertures 60 permit cooling fluid 54 to be discharged into a moving flow stream internal to the gas turbine engine. The apertures 60 can be structured to discharge the cooling fluid 54 at a variety of pressures, temperatures and flow rates. Though the gas turbine engine component 50 is depicted in FIG. 2 as an engine blade 58, in different embodiments, however, the gas turbine engine component 50 can take other forms. In addition, though the cooling fluid passageway 52 delivers cooling fluid 54 to the hot surface 56, in other embodiments the cooling fluid passageway 52 can be used to deliver the cooling fluid 54 to other surfaces whether or not considered a relatively hot surface.

Figure 3:
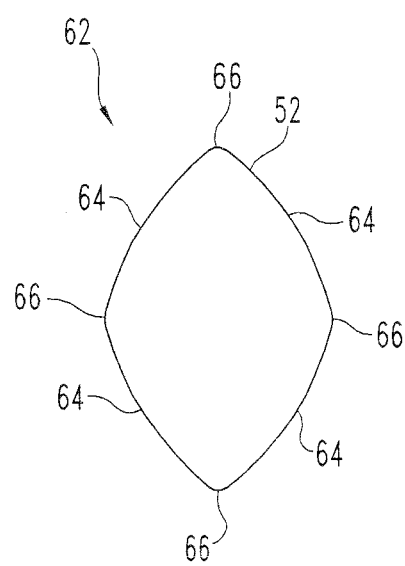
FIG. 3 depicts one form of a cross sectional shape of a cooling fluid passageway.

FIG. 3 depicts one embodiment of the cooling fluid passageway 52. The depiction in FIG. 3 represents a cross sectional shape 62 of the cooling fluid passageway 52 as seen when viewed along the length of the cooling fluid passageway 52 prior to it punching through the hot surface 56. The cross sectional shape 62 of the instant application is non-circular, which is different than cooling fluid passageways that employ circular cross sectional shapes. Shaping cooling fluid passageways 52 with non-circular cross sections has been found to reduce stress and, therefore, to improve fatigue life and/or allow for operation at relatively higher temperatures. In some applications a non-circular cross sectional shape has been found to reduce stress by up to 40%. In one study the stress of the cooling fluid passageway 52 was measured at the hot surface 56 where the cooling fluid passageway 52 punches through, but other locations could have alternatively been used.

The illustrative cross sectional shape 62 depicted in the figure generally has four sides 64 and four corners 66. Though similar reference numbers are used for each of the sides 64 and corners 66, no limitation is hereby intended regarding whether the geometric features of any of the sides or corners are similar. To set forth just one non-limiting example, the four corners need not be identical. In the illustrative embodiment the corners 66 and the sides 64 are not straight but rather include some amount of curvature. In some non-limiting embodiments the corners would not typically represent sharp corners, but can maintain a continuously changing curvature.

Figure 4:
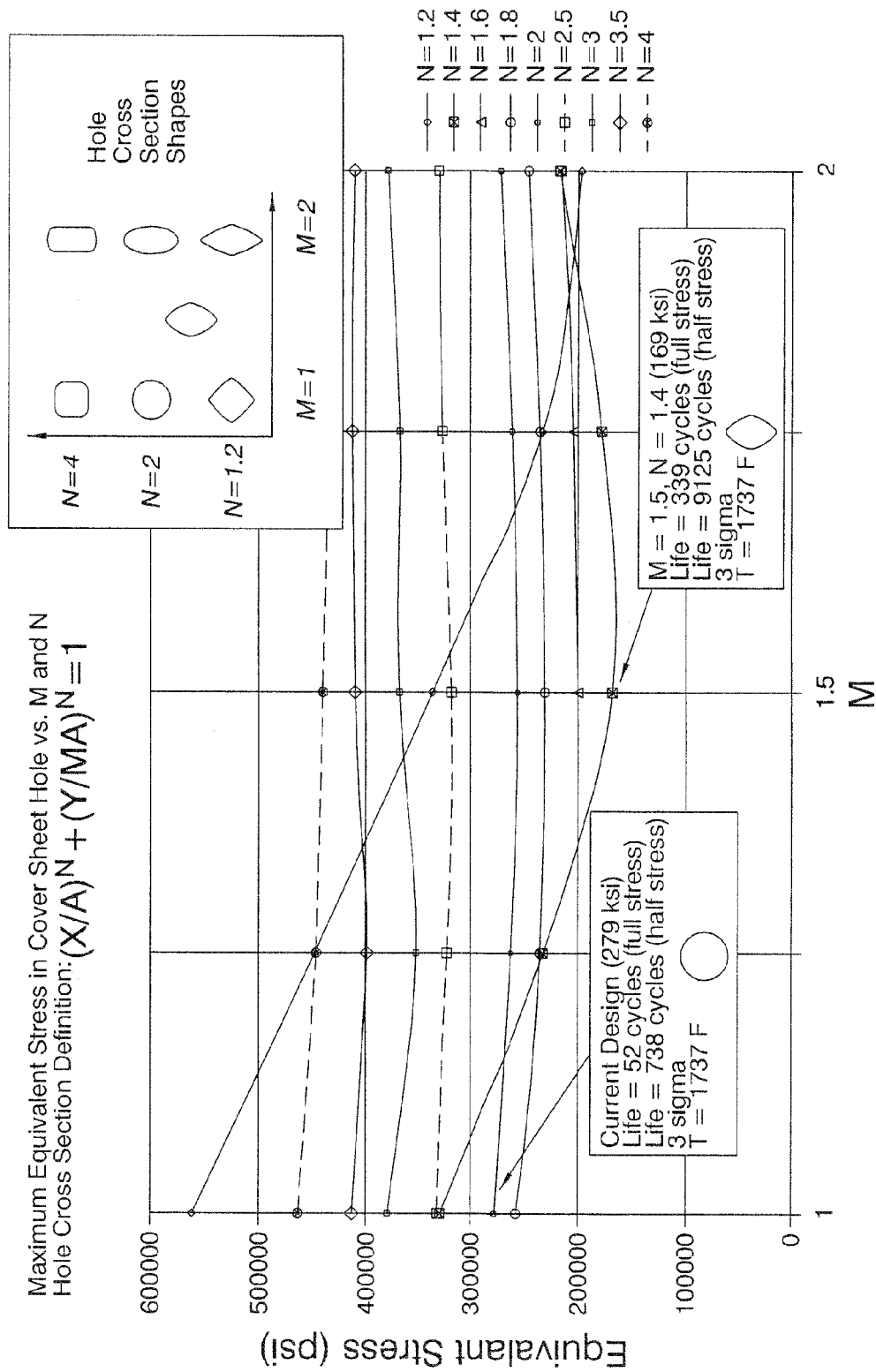
FIG. 4 depicts alternative cross sectional shapes of a cooling fluid passageway.

The cross sectional shape 62 of the cooling fluid passageway 52 can also take forms other than that depicted in FIG. 2. Turning now to FIG. 4, various alternative cross sectional shapes 62 are depicted in the upper right hand corner of the figure. The shapes in the figure have been created through a mathematical relationship which allowed for the stress of the gas turbine engine component 50 to be evaluated. A parametric study was conducted to identify a shape, or series of shapes, that permit for reducing the stress of the cooling fluid passageway 52. The mathematical relationship used to determine a lower stress level in the gas turbine engine component 50 is:

$$\left(\frac{x}{a}\right)^n + \left(\frac{y}{ma}\right)^n = 1,$$

where x and y are variables and a, m, and n selected as constants to define the shape. In one form the cross sectional shape of the hole is described by selecting m=1.5 and n=1.4. Relationships other than the mathematical equation represented by the study described in FIG. 3 can also be used.

Figure 5A:
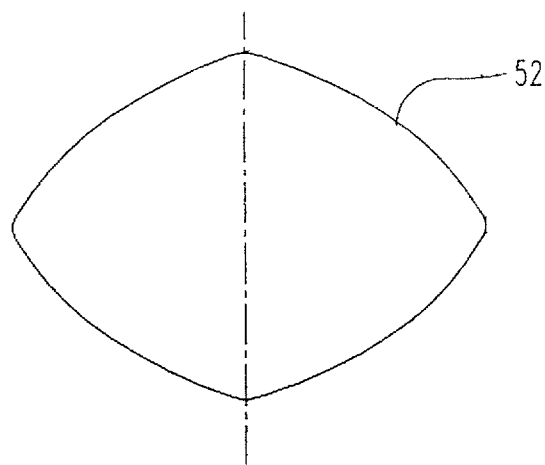
FIG. 5 depicts alternative cross sectional shapes of a cooling fluid passageway.
Figure 5B:
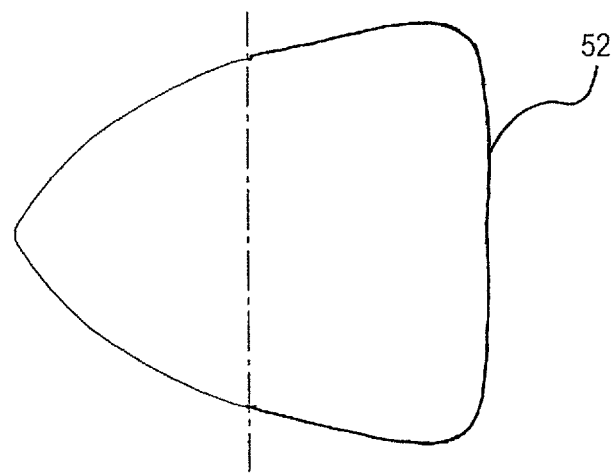

For example, FIGS. 5A and 5B depict-alternative shapes than that depicted in FIG. 3. FIG. 5A represents the cooling fluid passageway 52 having a shape that provides for good stress results, such as a reduction in stress relative to another cross sectional shape. FIG. 5B represents the cooling fluid passageway 52 having a shape that can be further altered to provide for good optimized film effectiveness.

Figure 6:
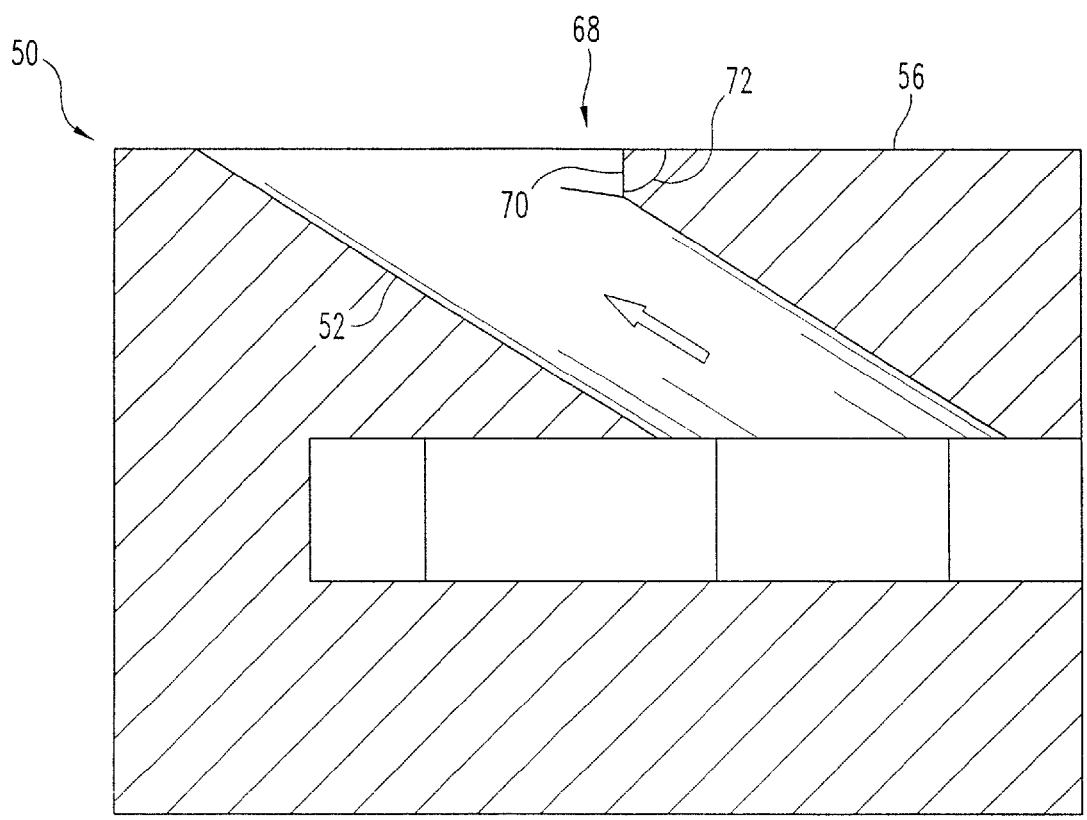
FIG. 6 depicts one form of a gas turbine engine component.

Turning now to FIG. 6, another embodiment of the gas turbine engine component 50 having the cooling fluid passageway 52 is depicted. The cooling fluid passageway 52 can take the same form as described above, whether circular or non-circular. In the illustrative form the cooling fluid passageway 52 includes an edge break 68 which represents a missing portion of overhanging material from the gas turbine engine component 50 formed between the cooling fluid passageway 52 and the hot surface 56. In some applications it has been found that stress in the gas turbine engine component 50 can be reduced by eliminating the overhanging material. The edge break 68 can be formed with the gas turbine engine component 50, such as during a casting operation. The edge break 68 includes an edge break surface 70 that forms an angle 72 with the hot surface 56. In the illustrative embodiment the angle 72 of the edge break surface 70 is a right angle, but in other embodiments the angle 72 can have different values. In some forms the angle can be between 45 degrees and 135 degrees. In still further forms the angle can be between 60 degrees and 120 degrees. Other values, and or ranges of values, are also contemplated herein.

In one form the edge break 68 can represent a Boolean subtraction of a rectangular columnar element from the gas turbine engine component 50, with the width of the rectangular columnar element the same as the lateral dimension of the cooling fluid passageway 52. In other forms the edge break 68 can represent a subtraction of a cylindrical columnar element from the gas turbine engine component 50, with the diameter of the cylindrical columnar element the same as the lateral dimension of the cooling fluid passageway 52. The rectangular columnar element or the cylindrical columnar element can be oriented at an angle relative to the hot surface 56. The edge break 68 can be represented in other ways.

Figure 7:
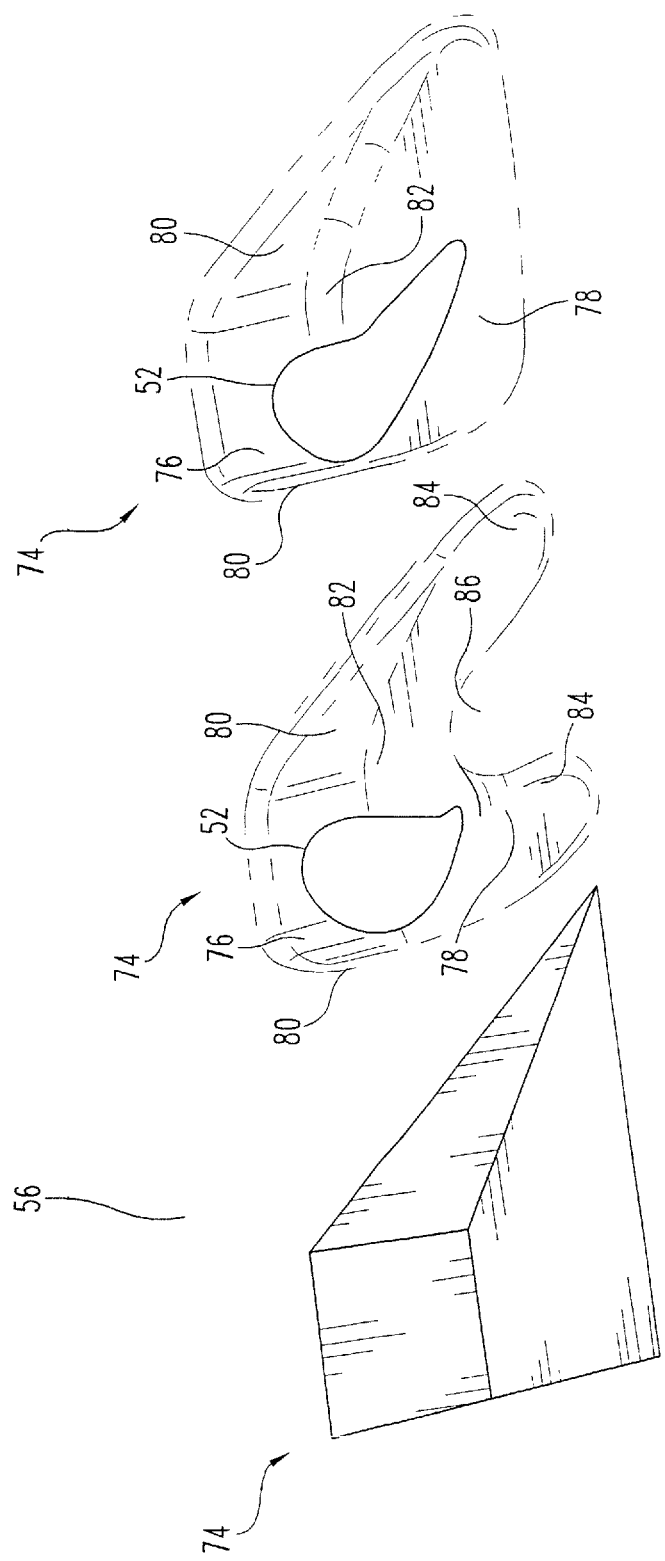
FIG. 7 depicts alternative forms of a gas turbine engine component.

Turning now to FIGS. 7A, 7B, and 7C, a cooling fluid passageway 52 can intersect a depression 74 formed in the hot surface 56. The figures depict one form of a depression 74 (FIG. 7A) without an intersecting cooling fluid passageway 52, another form of the depression 74 (FIG. 7B), and yet still another form of the depression 74 (FIG. 7C). Many other variations of the depression 74 are also contemplated herein. The depression 74 can form a diffusing ramp downstream to maintain good film effectiveness. Making reference to the two rightmost depressions 74, each depression includes an upstream portion 76, a downstream portion 78, a low point 82 between the two, and opposing sides 80. In one form the upstream portion 76 can be at an angle of 90 degrees relative to the hot surface 56, but in other forms it can include a range of angles such as, but not limited to, between 45 degrees and 135 degrees, and between 60 degrees and 130 degrees. Various relative orientations can be provided to assist in reducing a stress concentration factor. In still other forms the upstream portion 76 can be an edge break surface 70 of the type described above. The upstream portion 76 can be a planar surface, but also can take on other shapes in different embodiments.

The downstream portion 78 can ascend from the low point 82 at a variety of angles relative to the hot surface 56. In one form the downstream portion 78 is at a relatively shallow 15-20 degree angle to the hot surface. Other angles are also contemplated herein. The downstream portion 78 can be planar in shape in some embodiments, but in other embodiments can take on other forms.

The low point 82 can take a variety of forms, which can depend on the relative shapes of both upstream portion 76 and downstream portion 78. In some forms the low point 82 can take the form of a relatively straight line between the opposing sides 80. Other shapes are also contemplated.

The opposing sides 80 can be formed at any angle relative to each of the hot surface 56, upstream portion 76 and downstream portion 78.

The cooling fluid passageway 52 intersects the depression 74 in both the upstream portion 76 and downstream portion 78. The extent to which the cooling fluid passageway 52 exits into the upstream portion 76 and downstream portion 78 can be dependent upon the relative orientation of the cooling fluid passageway 52 and each of the upstream portion 76 and downstream portion 78. The cooling fluid passageway 52 can take the form of the cooling fluid passageway 52 discussed above, whether circular or non-circular.

In the illustrative embodiment in FIG. 7B, the downstream portion 78 includes two extensions 84 which form a protrusion 86. The extensions 84 and protrusion 86 can take other forms in different embodiments.

Figure 8:
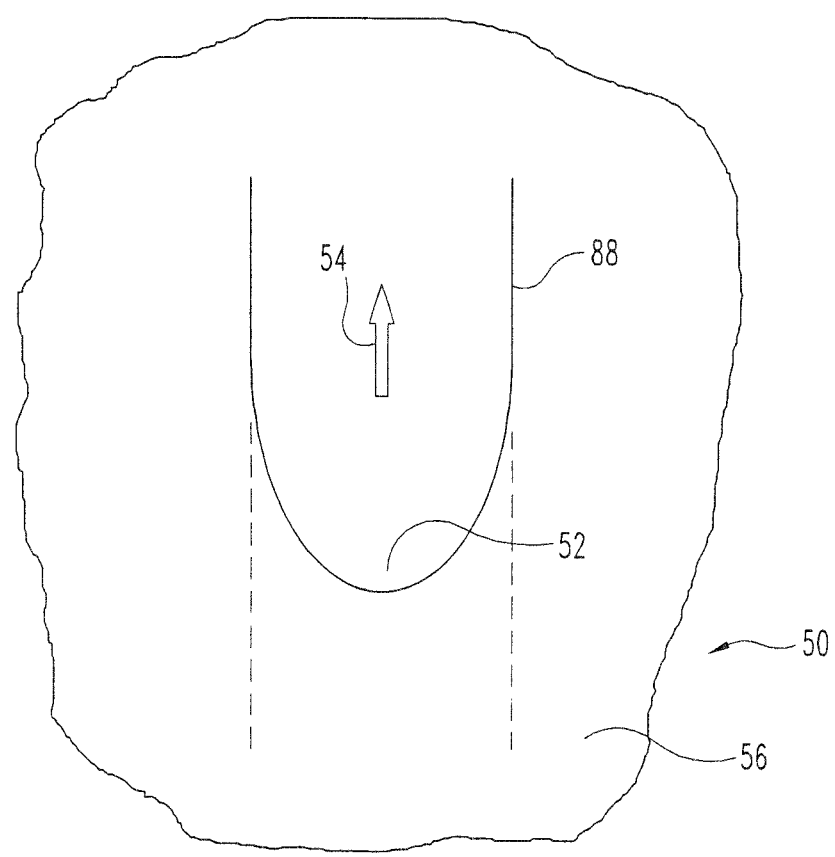
FIG. 8 depicts another embodiment of a gas turbine engine component.

FIG. 8 depicts yet another embodiment of the present application with a view from above looking toward the hot surface 56 of the gas turbine engine component 50. Cooling fluid 54 is shown exiting the cooling fluid passageway 52. The intersection of the cooling fluid passageway 52 and the hot surface 56 is depicted by the reference numeral 88. Dashed lines represent a side of the cooling fluid passageway 52 located below the hot surface 56 of the gas turbine engine component 50.

One aspect of the present application provides an apparatus comprising a film cooled gas turbine engine component having a passage defined by a passage surface for flowing a cooling air to a hot side, the passage extending at an acute angle to the hot side surface and the passage surface having a hot side surface side, and an edge break formed in the gas turbine engine component and having an edge break surface extending from the hot side surface to the hot side surface side of the passage, the side of the passage opposite the hot side surface side continuing to the hot side, the edge break representing an overhanging material absent from the gas turbine engine component when an edge break surface is formed.

Another aspect of the present application provides an apparatus comprising a gas turbine engine turbine component having film cooling and a passage for conveying a cooling air to a surface of the gas turbine engine component, the passage having a non-circular cross sectional shape that produces a first stress under a loading condition that is relatively lower than a second stress produced by a passage that includes a circular cross sectional shape.

Yet another form of the present application provides an apparatus comprising a coolable gas turbine engine component having a hot side and a film cooling opening operable to discharge a cooling fluid to create a film cooling for the hot side, and a depression formed in part by an edge break of a cooling hole and having an upstream portion that descends from the hot side to a valley, an upstream portion that ascends from the valley toward the hot side, the film cooling opening having a portion that discharges through the upstream portion and a portion that discharges through the downstream portion of the depression.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a film cooled gas turbine engine component having a passage defined by a passage surface for flowing a cooling air to a hot side, the passage extending at an acute angle to the hot side surface and the passage surface having a hot side surface side; and
   an edge break formed in the gas turbine engine component and having an edge break surface extending from the hot side surface to the hot side surface side of the passage, the side of the passage opposite the hot side surface side continuing to the hot side, the edge break representing an overhanging material absent from the gas turbine engine component when an edge break surface is formed; and
   wherein the passage includes a non-circular cross section defined by $$\left(\frac{x}{a}\right)^n + \left(\frac{y}{ma}\right)^n = 1,$$

where x and y are variables and a, m, and n selected as constants to define the shape of the non-circular cross section; and
   wherein in the pair {m,n}, n does not equal 2 and m does not equal 1.

2. The apparatus of claim 1, wherein the edge break surface forms an angle of 45 degrees relative to the hot side surface.

3. The apparatus of claim 1, wherein the edge break surface extends to lateral edges of the passage.

4. The apparatus of claim 1, which further includes a ramp formed between a bottom edge of the edge break surface relative to the hot side surface and extending to the hot side surface at an angle less than the acute angle of the passage.

5. The apparatus of claim 4, wherein the passage exit is defined by the edge break surface and a surface of the ramp.

6. The apparatus of claim 1, wherein the edge break is part of a monolithic construction that includes a portion of the film cooled gas turbine engine component defining the passage.

7. The apparatus of claim 1, wherein the passage includes sides located between rounded corners and symmetric about two axes.

8. The apparatus of claim 7, wherein the sides are curved between the rounded corners.

9. The apparatus of claim 1, wherein the edge break surface forms an angle of between 60 degrees and 120 degrees relative to the hot side surface.

10. An apparatus comprising:
    a gas turbine engine turbine component having film cooling and a passage for conveying a cooling air to a surface of the gas turbine engine component, the passage having a non-circular cross sectional shape that produces a first stress under a loading condition that is relatively lower than a second stress produced by a passage that includes a circular cross sectional shape; and
    which further includes a diffuser between the surface and the passage; and
    wherein the diffuser includes a valley positioned between an upstream edge break and a downstream ramp, wherein the upstream edge break represents material missing from the gas turbine engine component by the failure of the passage to extend intact to the surface of the gas turbine engine component;
    wherein the passage takes the form of a cross sectional shape defined by a mathematical equation, the cross sectional shape representing the cross section that corresponds to the flow area of the passage;
    wherein the shape is defined by $$\left(\frac{x}{a}\right)^n + \left(\frac{y}{ma}\right)^n = 1,$$

where x and y are variables and a, m, and n selected as constants to define the shape; and
    wherein the values of m and n are not {1,2}.

11. The apparatus of claim 10, wherein the passage includes sides located between rounded corners and symmetric about two axes.

12. The apparatus of claim 11, wherein the sides are curved between the rounded corners.

13. The apparatus of claim 10, which further includes an upright surface formed between the passage for conveying a cooling air and the surface of the gas turbine engine component.

14. The apparatus of claim 10, wherein the passage extends at an acute angle to a hot side of the gas turbine engine turbine component.

15. The apparatus of claim 10, wherein the edge break is part of a monolithic construction that includes a portion of the gas turbine engine component defining the passage.

16. An apparatus comprising:
a coolable gas turbine engine component having a hot side and a film cooling opening operable to discharge a cooling fluid to create a film cooling for the hot side; and
a depression formed in part by an edge break of a cooling hole and having an upstream portion that descends from the hot side to a valley, a downstream portion that ascends from the valley toward the hot side, the film cooling opening having a portion that discharges through the upstream portion and a portion that discharges through the downstream portion of the depression, wherein the edge break is defined as a surface formed in the coolable gas turbine engine component between the hot side and a passage that provides the film cooling opening, wherein the edge break is part of a monolithic construction that includes a portion of the coolable gas turbine engine component defining the cooling hole;
wherein the valley extends in a line from one lateral side of the film cooling opening to another side of the film cooling opening.

17. The apparatus of claim 16, which further includes opposing sidewalls on each end of the downstream and upstream portion, wherein the downstream portion is substantially planar.

18. The apparatus of claim 16, wherein the upstream portion is substantially planar.

19. The apparatus of claim 16, wherein the passage includes a non-circular cross section.

20. The apparatus of claim 16, wherein a cross sectional shape corresponding to the flow area of the passage is defined by $$\left(\frac{x}{a}\right)^n + \left(\frac{y}{ma}\right)^n = 1,$$

where x and y are variables and a, m, and n selected as constants to define the shape.

21. The apparatus of claim 16, wherein the passage extends at an acute angle to the hot side.

22. The apparatus of claim 16, wherein the passage includes sides located between rounded corners and symmetric about two axes.

23. The apparatus of claim 22, wherein the sides are curved between the rounded corners.

* * * * *